(12) United States Patent
Sun et al.

(10) Patent No.: US 12,396,476 B2
(45) Date of Patent: Aug. 26, 2025

(54) TOBACCO GRANULES AND METHOD OF PRODUCING TOBACCO GRANULES

(71) Applicant: U.S. Smokeless Tobacco Company LLC, Richmond, VA (US)

(72) Inventors: Yan Helen Sun, Midlothian, VA (US); Frank Scott Atchley, Tarpon Springs, FL (US)

(73) Assignee: U.S. Smokeless Tobacco Company LLC, Richmond, VA (US)

( * ) Notice: Subject to any disclaimer, the term of this patent is extended or adjusted under 35 U.S.C. 154(b) by 293 days.

(21) Appl. No.: 17/074,008

(22) Filed: Oct. 19, 2020

(65) Prior Publication Data

US 2021/0045430 A1 Feb. 18, 2021

Related U.S. Application Data

(60) Continuation of application No. 15/042,682, filed on Feb. 12, 2016, now Pat. No. 10,820,622, which is a division of application No. 12/641,915, filed on Dec. 18, 2009, now Pat. No. 9,307,787.

(60) Provisional application No. 61/139,375, filed on Dec. 19, 2008.

(51) Int. Cl.
| | |
|---|---|
| *A24B 13/00* | (2006.01) |
| *A24B 15/16* | (2020.01) |
| *A24B 15/18* | (2006.01) |
| *A24B 15/28* | (2006.01) |
| *A24B 15/30* | (2006.01) |
| *B01J 13/04* | (2006.01) |

(52) U.S. Cl.
CPC ............ *A24B 15/186* (2013.01); *A24B 13/00* (2013.01); *A24B 15/16* (2013.01); *A24B 15/283* (2013.01); *A24B 15/303* (2013.01); *B01J 13/04* (2013.01)

(58) Field of Classification Search
CPC .............................. A24B 13/00; A24B 15/186
See application file for complete search history.

(56) References Cited

U.S. PATENT DOCUMENTS

| | | | |
|---|---|---|---|
| 1,553,326 | A | 9/1925 | Sensabaugh, Jr. |
| 1,878,852 | A | 9/1932 | Hoppier |
| 2,986,475 | A | 5/1961 | Mesnard |
| 3,687,717 | A | 8/1972 | Philip |
| 4,528,993 | A | 7/1985 | Sensabaugh, Jr. et al. |

(Continued)

FOREIGN PATENT DOCUMENTS

| | | |
|---|---|---|
| GB | 1553326 A | 9/1979 |
| JP | A 53-30000 | 3/1978 |

(Continued)

OTHER PUBLICATIONS

Merriam-Webster Dictionary, Definition of Same, https://www.merriam-webster.com/dictionary/same (Year: 2023).*

(Continued)

*Primary Examiner* — Russell E Sparks
(74) *Attorney, Agent, or Firm* — Harness, Dickey & Pierce, P.L.C.

(57) ABSTRACT

A smokeless tobacco product includes a plurality of orally disintegrable granules. Each granule has a core and at least one layer surrounding the core. The at least one layer includes tobacco particles and a binder. Also disclosed are methods of making tobacco granules that comprise a core and at least one layer having tobacco particles and a binder.

13 Claims, 2 Drawing Sheets

(56) References Cited

U.S. PATENT DOCUMENTS

| | | | |
|---|---|---|---|
| 4,545,392 A | 10/1985 | Sensabaugh, Jr. et al. | |
| 4,660,577 A | 4/1987 | Sensabaugh et al. | |
| 4,675,140 A | 6/1987 | Sparks et al. | |
| 4,759,956 A | 7/1988 | Amer et al. | |
| 4,811,746 A | 3/1989 | Davis | |
| 4,848,373 A | 7/1989 | Lenkey | |
| 4,987,907 A | 1/1991 | Townend | |
| 5,372,149 A | 12/1994 | Roth et al. | |
| 5,803,081 A * | 9/1998 | O'Donnell, Jr. ....... | A24B 15/18 131/299 |
| 6,182,670 B1 | 2/2001 | White et al. | |
| 7,032,601 B2 * | 4/2006 | Atchley ................ | A24B 13/00 131/359 |
| 7,776,927 B2 | 8/2010 | Chu et al. | |
| 8,124,147 B2 | 2/2012 | Cheng et al. | |
| 8,387,623 B2 | 3/2013 | Atchley et al. | |
| 9,307,787 B2 * | 4/2016 | Sun ........................ | A24B 13/00 |
| 2004/0020503 A1 | 2/2004 | Williams | |
| 2004/0118422 A1 | 6/2004 | Lundin et al. | |
| 2004/0194793 A1 * | 10/2004 | Lindell .................... | A23B 4/10 131/270 |
| 2005/0061339 A1 | 3/2005 | Hansson et al. | |
| 2005/0089548 A1 | 4/2005 | Virgalitto et al. | |
| 2005/0098187 A1 | 5/2005 | Grierson et al. | |
| 2005/0178398 A1 | 8/2005 | Breslin et al. | |
| 2005/0244521 A1 | 11/2005 | Strickland | |
| 2006/0127329 A1 * | 6/2006 | Xu ........................ | A61K 8/9789 424/769 |
| 2006/0191548 A1 * | 8/2006 | Strickland .............. | A24B 15/16 131/347 |
| 2007/0000505 A1 | 1/2007 | Zhuang et al. | |
| 2007/0012328 A1 | 1/2007 | Winterson et al. | |
| 2007/0190157 A1 * | 8/2007 | Sanghvi ................ | B65D 65/46 424/489 |
| 2008/0029110 A1 | 2/2008 | Dube et al. | |
| 2008/0209586 A1 | 8/2008 | Nielsen et al. | |
| 2008/0308115 A1 | 12/2008 | Zimmermann | |
| 2009/0293889 A1 | 12/2009 | Kumar et al. | |
| 2016/0157517 A1 | 6/2016 | Sun et al. | |

FOREIGN PATENT DOCUMENTS

| | | |
|---|---|---|
| JP | A 62-126949 | 6/1987 |
| JP | 2005-510213 A | 4/2005 |
| JP | 2008-541727 A | 11/2008 |
| WO | WO-03/28492 A1 | 4/2003 |
| WO | WO-2006/127772 A2 | 11/2006 |
| WO | WO-2006136197 A1 | 12/2006 |
| WO | WO-07/37962 A1 | 4/2007 |

OTHER PUBLICATIONS

U.S. Appl. No. 61/141,968, filed Dec. 18, 2008, Atchley.
International Preliminary Report on Patentability from corresponding PCT Application No. PCT/US2009/068700 issued Jun. 21, 2011 (6 pages).
International Search Report and The Written Opinion from corresponding PCT Application No. PCT/US2009/068700 mailed Jul. 5, 2010, 13 pages.
International Search Report and Written Opinion for Application No. PCT/US2009/068700, dated May 7, 2010, 12 pages.
Japanese Office Action in Japanese Application No. 2011-542478, mailed Dec. 18, 2013, 4 pages.
Japanese Office Action in Japanese Application No. 2011-542478, dated Oct. 20, 2014, 6 pages (with translation).
Japanese Office Action in Japanese Application No. 2011-542478, dated May 20, 2015, 13 pages (with translation).
Tamura, et al. "An Enhancing Effect on the Saltiness of Sodium Chloride of Added Amino Acids and Their Esters," Agric. Biol. Chem., 1989, 53, pp. 1625-1633.
Tso (1999, Chapter 1 in Tobacco, Production, Chemistry and Technology, Davis & Nielsen, eds., Blackwell Publishing, Oxford).
Non-Final Office Action issued Dec. 12, 2012 in U.S. Appl. No. 12/641,915.
Non-Final Office Action issued Aug. 6, 2013 in U.S. Appl. No. 12/641,915.
Non-Final Office Action issued Apr. 16, 2014 in U.S. Appl. No. 12/641,915.
Notice of Allowance issued Dec. 26, 2014 in U.S. Appl. No. 12/641,915.
Non-Final Office Action issued May 4, 2015 in U.S. Appl. No. 12/641,915.
Notice of Allowance issued Nov. 6, 2015 in U.S. Appl. No. 12/641,915.
Non-Final Office Action issued Aug. 16, 2018 in U.S. Appl. No. 15/042,682.
Final Office Action issued Jan. 24, 2019 in U.S. Appl. No. 15/042,682.
Non-Final Office Action issued Jul. 29, 2019 in U.S. Appl. No. 15/042,682.
Final Office Action issued Oct. 30, 2019 in U.S. Appl. No. 15/042,682.
Non-Final Office Action issued Mar. 23, 2020 in U.S. Appl. No. 15/042,682.
Notice of Allowance issued Jul. 10, 2020 in U.S. Appl. No. 15/042,682.
Filter Solutions Inc., "Mesh to Micron Conversion Chart", (year:2018) "http://filtersolutions.com/pdf/mesh%20to%20micron%20conversion%20chart.pdf".
J.M. Krochta et al., "Edible & biodegradable polymer films: Challenges and opportunities," Food Technology, 51(2):61-74, Jan. 1997.
Glicksman, "Food Hydrocolloids" CRC Press, 1982.
Krochta, et al., "Edible Coatings and Films to Improve Food Quality," Technomic Co., Inc. 1994.
"Industrial Gums" Academic Press, Inc. 1993.
Nussinovitch, "Water-Soluble Polymer Applications in Foods," Blackwell Science Ltd., 2003.
Tamura et al., "An enhancing effect on the saltiness of sodium chloride of added amino acids and their esters," Agric. Biol. Chem., vol. 53, pp. 1625-1633, 1989.
Dunkel et al., "Molecular and sensory characterization of gamma-glutamyl peptides as key contributors to the kokumi taste of edible beans (*Phaseolus vulgaris* L.)," J. Agric. Food Chem., vol. 55, pp. 6712-6719, 2007.

* cited by examiner

TOBACCO GRANULES AND METHOD OF PRODUCING TOBACCO GRANULES

CROSS-REFERENCE TO RELATED APPLICATIONS

This application is a continuation of U.S. application Ser. No. 15/042,682, filed Feb. 12, 2016, which is a divisional application of U.S. application Ser. No. 12/641,915, filed Dec. 18, 2009, which claims priority to Provisional U.S. Application Ser. No. 61/139,375, filed on Dec. 19, 2008, the entire contents of each of which are hereby incorporated by reference.

TECHNICAL FIELD

This invention relates to tobacco granules and a method of producing the same.

BACKGROUND

Smokeless tobacco products are orally consumed without subjecting the product to combustion. These products are manufactured in a variety of forms including chewing tobacco, dry snuff and moist snuff. Generally, these types of products are made as follows with the steps being in no particular order: cutting or grinding the tobacco into a suitable size; dipping or spraying the tobacco with a casing solution; partially drying the cased tobacco; holding the tobacco in containers for a period of time; and packaging the tobacco. See, for example, U.S. Pat. Nos. 4,528,993; 4,660,577; and 4,987,907.

Snuffs are often marked as either "dry" or "moist." Dry snuffs are generally finely ground and have a typical moisture content of about 8% by volume. Moist snuffs can have a variety of particle sizes and typically have a moisture content of about 40% to about 60% by weight.

Smokeless tobacco products are often treated with a variety of flavors to provide a desirable taste experience. However, there remains a need for smokeless tobacco products with novel flavor characteristics.

SUMMARY

This disclosure describes a smokeless tobacco product that includes a plurality of orally disintegrable granules. Each granule has a core and at least one layer surrounding the core. The at least one layer includes tobacco particles and a binder. In some cases, the core and the at least one layer are comprised of essentially the same composition of tobacco particles and binder.

The core can have a diameter of between 300 micrometers and 2 millimeters. The cores can each have a core largest diameter and the tobacco particles can each have a core largest diameter that is not more than ⅓ of the size of the core largest diameter. In some embodiments, each of the tobacco particles have a tobacco particle diameter that is no more than ⅕ the size of the core largest diameter. In some embodiments, the granules include non-tobacco cores. For example, the core can include a carbohydrate, a water-soluble polymer, a flavorant, a salt, or a combination thereof. In other embodiments, the core can include tobacco. In some embodiments, the core can include tobacco powder and a binder.

The tobacco particles can include a non-fermented tobacco. In some embodiments, the tobacco particles includes dry snuff. In some embodiments, the tobacco particles are cured tobacco particles prepared from tobacco plants having less than 20 µg of DVT per $cm^2$ of green leaf tissue. The tobacco particles in the at least one layer can have an average diameter of less than 100 micrometers.

The binder can be selected from the group consisting of carboxymethyl cellulose, hydroxypropyl cellulose, hydroxyethyl cellulose, hydroxypropyl methyl cellulose, methyl cellulose, konjac, collagen, inulin, soy protein, whey protein, casein, wheat gluten, carrageenan, alginates, propylene glycol alginate, xanthan, dextran, pullulan, curdlan, gellan, locust bean gum, guar gum, tara gum, gum tragacanth, pectin, agar, zein, karaya, gelatin, psyllium seed, chitin, chitosan, gum acacia, polyvinyl pyrrolidone, polyethylene oxide, polyvinyl alcohol, and combinations thereof. In some embodiments, binder includes a hydroxyl-containing compound and a dextran or dextran derivative.

The granule can be generally spherical. In some embodiments, the granule has a diameter of between 500 micrometers and 5 millimeters.

The at least one layer can further include a flavorant. For example, the flavorant can be selected from licorice, wintergreen, cherry and berry type flavorants, DRAMBUIE™ brand liqueur, bourbon, scotch, whiskey, spearmint, peppermint, lavender, cinnamon, cardamom, apium graveolens, clove, cascarilla, nutmeg, sandalwood, bergamot, geranium, honey essence, rose oil, vanilla, lemon oil, orange oil, Japanese mint, cassia, caraway, cognac, jasmin, chamomile, menthol, ylang-ylang, sage, fennel, piment, ginger, anise, coriander, coffee, mint oils from a species of the genus Mentha, and combinations thereof.

The granule can further include an additional layer concentrically surrounding the core. The additional layer has a different composition than the at least one layer with regard to tobacco particle concentration, type of tobacco particles, binder, flavorant, or combination thereof. In some embodiments, the additional layer and the at least one layer comprise different flavorants. The additional layer and the at least one layer can also different concentrations of tobacco.

The smokeless tobacco product can consist of a plurality of the granules. In other embodiments, the smokeless tobacco product includes additional components. For example, the smokeless tobacco product can include a pouch holding the plurality of granules. In some embodiments, the pouch can include an edible film. In some embodiments, the pouch includes a plurality of pores. In some embodiments, the smokeless tobacco product includes snuff and the plurality of granules are dispersed within the snuff. The snuff to granule ratio for the smokeless tobacco product can be between 1 and 90 weight/weight (wet).

The smokeless tobacco product can include a flavor profile having two or more different flavors each having a peak flavor intensity being perceptible at different times or concurrently during consumption. For example, the granules can each provide a flavor profile. A plurality of granules within a smokeless tobacco product can provide the same or different flavor profiles.

The plurality of orally-disintegrable granules can each be produced by fluidizing a plurality of cores within a fluid bed processor having a rotor, feeding a plurality of tobacco particles into the fluidized bed, and spraying a binder solution or suspension into the fluidized bed containing the fluidized cores. The binder solution or suspension can include a flavorant.

The core can further be coated by spraying a second binder solution or suspension into the fluidized bed after spraying said first binder solution to produce at least two concentric layers surrounding the core. Each of the binder solutions or suspensions can have a different composition. For example, the first binder solution or suspension can have a first flavorant and the second binder solution can have a second flavorant different from the first flavorant. In some embodiments, the layers are formed by altering the feed rate of tobacco into the fluidized bed to create adjacent layers having different concentrations of tobacco.

This disclosure describes a process for making a tobacco product. The process includes the steps of fluidizing a plurality of cores within a fluid bed that includes a rotor, feeding tobacco particles into the fluid bed, spraying a coating solution or suspension that includes a binder and a solvent or suspension fluid into the fluid bed containing the fluidized cores, and collecting granules formed after said spraying and said feeding. Each of the formed granules include a core surrounded by at least one layer that includes the binder and a plurality of tobacco particles. The rotor can be a conical rotor.

The method can further include introducing a flavorant into the fluid bed containing the fluidized cores. In some embodiments, the coating solution or suspension includes a flavorant.

The feeding of the tobacco particles into the fluid bed can include adding the tobacco particles to the coating solution or suspension so that the tobacco particles are fed to the fluid bed during said spraying of the coating solution or suspension. In some embodiments, the feeding of the tobacco particles can include feeding the tobacco particles separately from the spraying of the coating solution or suspension. The feeding step can be concurrent with said spraying step. In other embodiments, the feeding step is prior to the spraying step. In other embodiments, the feeding step is after said spraying step.

The method can also include changing the composition of the binder solution or suspension during said spraying step to thereby produce two or more concentric layers on said core such that each of the formed layers have a different composition.

The method can also include feeding a plurality of starch particles, or any other filler material, into the fluidized bed. In some embodiments, the plurality of starch particles are mixed with the tobacco particles and the starch particles and the tobacco particles are fed to the fluid bed in a common feeder.

The details of one or more embodiments are set forth in the accompanying drawings and the description below. Other features, objects, and advantages will be apparent from the description and drawings, and from the claims.

DESCRIPTION OF DRAWINGS

Like reference symbols in the various drawings indicate like elements.

DETAILED DESCRIPTION

Figure 1A:
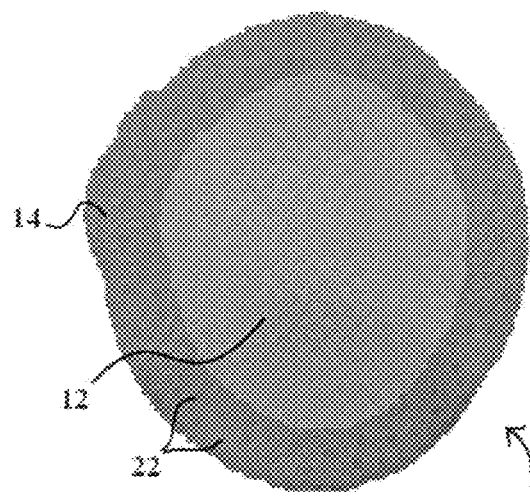
FIGS. 1A-1D depict cross-sectional views of orally disintegrable granules according to different embodiments.

This disclosure describes a smokeless tobacco product that includes a plurality of orally disintegrable granules 10. Examples of orally disintegrable granules 10 are shown in FIGS. 1A, 1B, 1C, and 1D. Each granule has a core 12 and at least one layer 14 surrounding the core 12 that contains tobacco particles 22 and a binder. In some cases, the core and the at least one layer are the same or similar material. Each granule 10 can include more than one layer surrounding the core. Thus, the present disclosure describes granules having different arrangements, methods of making the granules, and smokeless tobacco products including these granules. It has been discovered that granules according to the instant disclosure can confer unique flavor profiles on smokeless tobacco products.

I. Cores

Figure 1B:
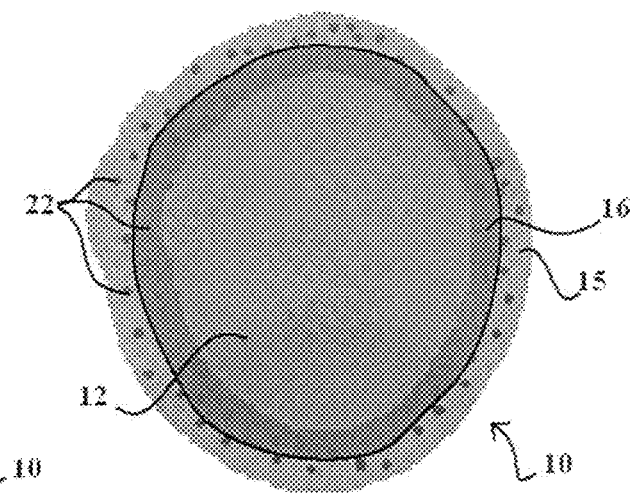
Figure 1C:
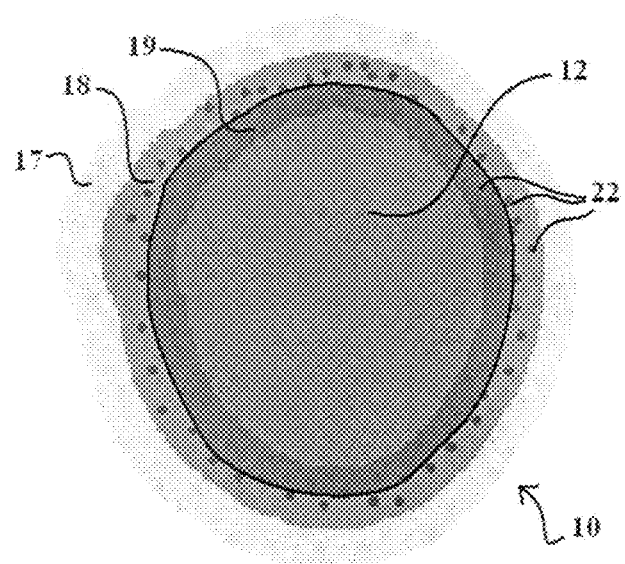
Figure 1D:
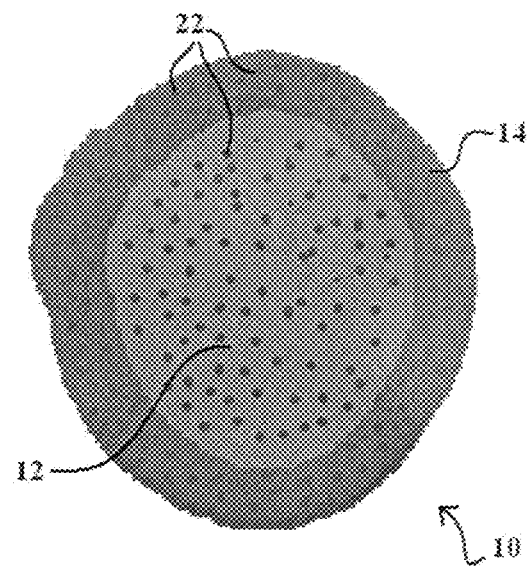

Cores 12 have a diameter of between 300 micrometers and 2 millimeters. In some embodiments, the cores have a diameter of between 500 micrometers and 1 millimeter (e.g., about 0.8 millimeter). In some embodiments, the cores 12 can include a carbohydrate, a water-soluble polymer, a flavorant, a salt, or a combination thereof. For example, a carbohydrate can include one or more sugars, such as glucose, lactose, or sucrose. For example, a water-soluble polymer can include starches and cellulose fibers. In some embodiments, the cores 12 are granulated sugar. Salts can include, for example, a citric acid salt or sodium chloride. Flavorants used as a core can include, for example, herbs, spices or teas. In some embodiments, the core is tobacco free. In other embodiments, the core can include tobacco. For example, the core can include a pressed core of tobacco powder. In other embodiments, such as shown in FIG. 1D, the core can include tobacco particles 22 within a matrix of other constituents. In some embodiments, the cores 12 can include sugar spheres formed from sucrose and starch, which can be obtained from the PAULAUR CORPORATION, located in Cranbury, New Jersey.

In some embodiments, the cores 12 can include gel cores including a plurality of constituents. Gel cores 12 can contain soluble or insoluble gels. The amount of water retained in the gels depend on the properties desired in the finished product. In some embodiments, as shown in FIG. 1D, gel cores can include tobacco particles 22 dispersed within the cores. Exemplary gel binders for soluble and insoluble gels include kappa carrageenan, sodium alginate, carboxymethyl cellulose, gelatin, pectin, agar, and starches. Soluble gels can be formed by dissolving a gel binder at an elevated temperature, e.g., kappa carrageenan at 180° F., and optionally adding other ingredients, such as a carbohydrate or tobacco particles to this solution while continuing vigorous mixing. The hot mixture is then deposited into a mold to form a plurality of cores. Gelatin provides a weak gel at room temperature but firmness and stability can be increased by the addition of agar or starches. Other gelling binders may be used in a similar manner. Insoluble gels can be formed by the addition of a cross-linking agent to a pre-dissolved solution or slurry. The solution is deposited into a mold to form a plurality of cores and sets up through cooling and/or drying. In most cases, it is necessary to maintain the solution at a high temperature, e.g., greater than 180° F., to prevent premature gelation prior to deposition into the mold. After the gel has set into a bead shape, the gel core can be further processed to form the granule 10 as is or be further dried to a desired water content. Cross-linking agents can include potassium ions for carrageenan, calcium ions for alginates and low methoxy pectins, and trivalent ions such as aluminum for carboxymethyl cellulose. In insoluble gels (i.e., those that do not orally disintegrate), flavor compounds may leach out of the gel as it is held or chewed in the mouth. For example, the gel beads disclosed in U.S. Patent Application Publication Nos. 2006/0191548 and 2008/0029110 can be used as cores 12.

II. Layer(s)

Granule 10 further includes at least one layer 14 surrounding the core 12. In some embodiments the core 12 and the at least one layer 14 are comprised of the same or similar material. In some embodiments, as shown in FIGS. 1A and 1D, the granule 10 can include a single layer 14 surrounding the core 12. Layer 14 includes a binder and tobacco particles 22. In other embodiments, the granule 12 includes a plurality of layers. FIG. 1B depicts an embodiment including two layers 15 and 16, each including tobacco particles 22 and a binder. In some cases, the core 12 further comprises tobacco. Layers 15 and 16 can differ in composition. For example, layers 15 and 16 can differ in the type or concentration of tobacco particles 22, the type of binder, and/or the type or concentration of flavorant. FIG. 1C depicts an embodiment including three layers 17, 18, and 19. Layers 18 and 19 include tobacco particles 22 and a binder, while layer 17 does not include tobacco. Layers 18 and 19 can differ in the type or concentration of tobacco particles 22, the type of binder, and/or the type or concentration of flavorant. Layer 17 can include the same or a different flavorant from layers 18 and 19. In some embodiments, layer 17 can include other filler constituents, such as starch powders. In other embodiments, not specifically shown, the granules 10 can include any number of layers in which the layers can each have the same or different constituents in different orders. For example, a granule could include six or more alternating layers in which every other layer includes tobacco particles, each successive layer includes a different flavorant, and the binder varies between layers so different layers dissolve at different rates.

Binders

Binders suitable for use in the layers described herein include orally-compatible polymers, such as cellulosics (e.g., carboxymethyl cellulose (CMC), hydroxypropyl cellulose (HPC), hydroxyethyl cellulose (HEC), hydroxypropyl methyl cellulose (HPMC), and methyl cellulose (MC)); natural polymers (e.g., starches and modified starches, konjac, collagen, inulin, soy protein, whey protein, casein, and wheat gluten); seaweed-derived polymers (e.g., carrageenan (kappa, iota, and lambda); alginates, (and propylene glycol alginate); microbial-derived polymers (e.g., xanthan, dextran, pullulan, curdlan, and gellan); extracts (e.g., locust bean gum, guar gum, tara gum, gum tragacanth, pectin (lo methoxy and amidated), agar, zein, karaya, gelatin, psyllium seed, chitin, and chitosan); exudates (e.g., gum acacia (arabic) and shellac); and/or synthetic polymers (e.g., polyvinyl pyrrolidone, polyethylene oxide, and polyvinyl alcohol)). Other useful binders are known in the art, for example, see Krochta et al. Food Technology, 1997, 51:61-74; Glicksman Food Hydrocolloids CRC 1982; Krochta Edible Coatings and Films to Improve Food Quality Technomic 1994; Industrial Gums Academic 1993; Nussinovitch Water-Soluble Polymer Applications in Foods Blackwell Science 2003. In some embodiments, the binder can include hydroxypropyl methyl cellulose, which can be obtained from The Dow Chemical Company_under the trade names METHOCEL™ HPMC E5, E15, and K4M.

Tobacco

At least one of the layers surrounding the core 12 of a granule 10 contains a plurality of tobacco particles 22. The core 12 can optionally include tobacco particles 22. The average diameter of such tobacco particles 22 is typically no more than ⅓ the size of the largest diameter of the core 12. In some embodiments, the average tobacco particle 22 within a layer has an average diameter of no more than ⅕ the size of the average diameter of the core 12. For example, the core average diameter-to-tobacco particle average diameter ratio can be less than 10:1, less than 50:1, or less than 100:1. For example, the tobacco particles 22 can have an average diameter of less than 200 micrometers (e.g., an average tobacco particle diameter of between 10 micrometers and 40 micrometers, between 40 micrometers and 60 micrometers, between 60 micrometers and 80 micrometers, between 80 micrometers and 120 micrometers, between 120 micrometers and 160 micrometers, or between 160 micrometers and 200 micrometers). In some embodiments, the average tobacco particle diameter is between 20 micrometers and 40 micrometers (e.g., between 25 micrometers and 35 micrometers). In some embodiments, the tobacco particles 22 within the at least one layer have an average diameter of less than 100 micrometers (e.g., about 80 micrometers). For example, the tobacco particles 22 can include micronized tobacco powder. The tobacco particles 22 can be sized or made to disintegrate in the mouth (e.g., dissolve) or to give the perception of dissolvability (e.g., the tobacco does not produce a tactile experience in the mouth). For example, a micronized tobacco powder can have an average diameter of 27 micrometers and a ninety-ninth percentile diameter of 120 micrometers. Alternatively, the tobacco particles 22 may be sized or made to provide a tactile experience in the mouth.

Depending on the desired characteristics, each layer can have a final tobacco concentration ranging from 0 percent to 99 percent by weight (e.g., between 10 and 90 percent by weight, between 25 and 75 percent by weight, or between 40 and 60 percent by weight). For example, a layer can contain between 15 and 35 percent by weight tobacco (e.g., about 25 percent by weight). In some embodiments, the plurality of granules can each include at least one layer including greater than 20 percent tobacco (e.g., greater than 40 percent tobacco, greater than 60 percent tobacco, or greater than 80 percent tobacco).

The tobacco used in the granule 10, either as the tobacco particles 22 in the layers and/or within the core 12, is a tobacco suitable for use in smokeless tobacco products. By "tobacco" it is meant a part, e.g., leaves, flowers, and stems, of a member of the genus *Nicotiana*. Exemplary species of tobacco include *N. rustica, N. tabacum, N. tomentosiformis*, and *N. sylvestris*. Suitable tobaccos include fermented and unfermented tobaccos, dark air-cured, dark fire cured, burley, flue cured, and cigar filler or wrapper, as well as the products from the whole leaf stemming operation. For example, tobacco can be conditioned by heating, sweating and/or pasteurizing steps as described in U.S. Publication Nos. 2004/0118422 or 2005/0178398. Fermenting typically is characterized by high initial moisture content, heat generation, and a 10 to 20% loss of dry weight. See, e.g., U.S. Pat. Nos. 4,528,993; 4,660,577; 4,848,373; and 5,372,149. In addition to modifying the aroma of the leaf, fermentation can change either or both the color and texture of a leaf. Also during the fermentation process, evolution gases can be produced, oxygen can be taken up, the pH can change, and the amount of water retained can change. See, for example, U.S. Publication No. 2005/0178398 and Tso (1999, Chapter 1 in Tobacco, Production, Chemistry and Technology, Davis & Nielsen, eds., Blackwell Publishing, Oxford). Cured, or cured and fermented, tobacco can be further processed (e.g., cut, expanded, blended, milled or comminuted) prior to incorporating the tobacco into the granule 10. See, for example, U.S. Pat. Nos. 4,528,993; 4,660,577; and 4,987,907.

The tobacco can, in some embodiments, be prepared from plants having less than 20 μg of DVT per $cm^2$ of green leaf tissue. For example, the tobacco particles can be selected from the tobaccos described in U.S. Patent Publication No. 2008/0209586, which is hereby incorporated by reference. Tobacco compositions containing tobacco from such low-DVT varieties exhibits improved flavor characteristics in sensory panel evaluations when compared to tobacco or tobacco compositions that do not have reduced levels of DVTs.

Flavorants

The cores and/or the one or more layers can include one or more flavorants. Flavorants can produce a flavor release profile when the granules 10 are orally consumed. The flavor release profile can be customized by adjusting the ingredients and sizes of the layers. For example, by having a plurality of orally disintegrable granules each having the same pattern of layers, a user consuming the granules can identify a flavor profile, such as those described below.

Flavorants used within the granules 10 can be any flavorant known in the art. For example, suitable flavorants include wintergreen, cherry and berry type flavorants, various liqueurs and liquors such as DRAMBUIE™ brand liqueur, bourbon, scotch, whiskey, spearmint, peppermint, lavender, cinnamon, cardamon, apium graveolens, clove, cascarilla, nutmeg, sandalwood, bergamot, geranium, honey essence, rose oil, vanilla, lemon oil, orange oil, Japanese mint, cassia, caraway, cognac, jasmin, chamomile, menthol, ylang-ylang, sage, fennel, piment, ginger, anise, coriander, coffee, and mint oils from a species of the genus Mentha. Mint oils useful in the granules include spearmint and peppermint.

Other Layer Constituents

Depending on the desired characteristics, each layer may also include fillers (e.g., starch, di-calcium phosphate, lactose, sorbitol, mannitol, and microcrystalline cellulose), soluble fiber (e.g., FIBERSOL® from MATSUSHITA), calcium carbonate, dicalcium phosphate, calcium sulfate, and clays, lubricants (e.g., lecithin, stearic acid, hydrogenated vegetable oil, mineral oil, polyethylene glycol 4000-6000 (PEG), sodium lauryl sulfate (SLS), glyceryl palmitostearate, sodium benzoate, sodium stearyl fumarate, talc, and stearates (e.g., Mg or K), and waxes (e.g., glycerol monostearate, propylene glycol monostearate, and acetylated monoglycerides)), plasticizers (e.g., glycerine, propylene glycol, polyethylene glycol, sorbitol, mannitol, triacetin, and 1,3 butane diol), stabilizers (e.g., ascorbic acid and monosterol citrate, BHT, or BHA), artificial sweeteners (e.g., sucralose, saccharin, and aspartame), disintegrating agents (e.g., starch, sodium starch glycolate, cross caramellose, cross linked PVP), or other compounds (e.g., vegetable oils, surfactants, and preservatives). Some compounds display functional attributes that fall into more than one of these categories. For example, propylene glycol can act as both a plasticizer and a lubricant and sorbitol can act as both a filler and a plasticizer.

The layers can also include remnants of food grade solvent or suspension fluid used during a coating process. For example, the food grade solvent or suspension fluid can allow for the spraying of the binder within a fluid bed processor. A majority of the solvent or suspension fluid is generally evaporated during the coating process to form the layers of the granule, but trace amounts can remain. The solvent or suspension fluid can have a latent heat of vaporization of at least 300 KJ/kg. In some embodiments, the solvent or suspension fluid can have a latent heat of vaporization of between 500 KJ/kg and 2500 KJ/kg (e.g., between 800 and 2300 KJ/kg, between 500 and 1300 KJ/kg, or between 1300 and 2500 KJ/kg). For example, the latent heat of vaporization of ethanol is 841 KJ/kg and the latent heat of vaporization of water is 2260 KJ/kg. Typical solvents or suspension fluids include water, ethanol, methanol, isopropynol, acetone, and combinations thereof.

III. Smokeless Tobacco Products

A plurality of granules 10 can themselves be a smokeless tobacco product or can be incorporated with other materials into a smokeless tobacco product. Smokeless tobacco compositions incorporating a plurality of granules 10 can contain, without limitation, moist or dry smokeless tobaccos including snus-style products, loose tobacco in a pouch or pack or snuff tobaccos. See, e.g., U.S. Patent Publication Nos. 2005/0244521 and 2006/0191548 for descriptions of a number of smokeless tobacco compositions. Smokeless tobacco compositions having granules 10 mixed therein can provide the smokeless tobacco composition with a desired flavor release profile. The snuff-to-granule ratio for the smokeless tobacco product is not limited. In some embodiments, the snuff-to-granule ratio is between 1 and 90 weight/weight (wet). For example, the snuff to granule ratio can be between 30 and 65 weight/weight (wet).

Granules 10 can also be packaged with other smokeless tobacco products without the granules 10 being intermixed with the other smokeless tobacco products. For example, granules 10 can be packaged along with other smokeless tobacco products in a divided container, with the granules 10 in a different segment of the divided container. A divided container can allow a user to experience the granules alone, the other smokeless tobacco product(s) alone, or a combination of the products together. A plurality of different types of granules 10 could also be included in different sections of a divided container. In other embodiments, the granules 10 are encapsulated in one or more blisters inside the container of a smokeless tobacco product to allow for a user selectively increase or alter the flavor of the smokeless tobacco product. For example, a user can have moist smokeless tobacco product container with multiple blister packs inside the lid, each blister pack having granules providing a different flavor profile, thus the user can elect a particular flavor or combination of flavors or elect to not use any flavors at all. Furthermore, granules can be added to increase the flavor intensity after an initial use.

A plurality of the granules can, in some embodiments, be sold alone in packages for direct oral consumption. For example, granules 10 can be packaged loosely in sugar type paper packages, slide fastener plastic bags, blister packs, portion-control dispensers (e.g., like a pepper grinder), straws or tubes with sealed ends, and box-like containers. For example, a container can have a shape and size approximating that of a cigarette pack or cigarette lighter. In some embodiments, a plurality of granules 10 can be packaged in an open or highly porous wrapping material, (e.g., fabrics, paper or plastic films), with or without additional smokeless tobacco product. In other embodiments, a plurality of granules 10 can be packaged in a consumable package, (e.g., a pouch made of a pair of edible film strips sealed or adhered together along their edges). For example, the edible film used to produce a consumable package could be of the type described in U.S. Patent Publication No. 2005/0089548, which is hereby incorporated by reference. A plurality of different types of granules 10 can be packaged together. In some embodiments, a first plurality of granules 10 having a first flavor profile are packaged with a second plurality of granules 10 having a second and different flavor profile. The first and second pluralities of granules can be visually differentiated by have different exterior colors. Differently granule groups can be mixed or segregated.

Mixtures of granules, with or without other smokeless tobacco compositions or other ingredients, can be molded, extruded, pressed, or otherwise formed into shaped smokeless tobacco pieces. In some embodiments, mixtures of granules, with or without other smokeless tobacco compositions or other ingredients, can be compressed to form a tablet or disc. A tablet could then be packaged and/or dispensed in a dispenser that includes stacked tablets and individually pushes out one tablet at a time upon activation of a dispensing mechanism. For example, granules 10 can be included in a non-dissolvable tobacco tablet or disc where the granules 10 are dispersed within a matrix of non-dissolvable smokeless tobacco material. A smokeless tobacco tablet or disc can also be made entirely of granules 10 pressed together. In other embodiments, a tablet could include a granule 10 layer on one side and a smooth texture of another smokeless tobacco product on the reverse side to provide a texture interplay. Granules 10 can also be pressed into a bar or stick shape. Pluralities of granules 10 can also be pressed into irregular cluster shapes. In some embodiments, clusters of granules 10 can include a lipid coating (e.g., steric acid). Granules 10 can also be pressed into a flexible tape, which can be rolled up for distribution. The granules can also be molded around preformed items, such as toothpicks, pretzel sticks, other small cylinder shapes, or a flexible carrier. For example, granules 10 can be molded into pearl-like beads on a string to form a tobacco granule necklace.

Granules 10 can also include outer coatings that can give the granules 10 desired bulk properties. For example, the outer coating can include a sticky coating that allows a user to pinch a plurality of granules 10 together for consumption. In other embodiments, granules 10 can include an outer coating that inhibits bonding between granules 10, such that the granules 10 will easily flow. In other embodiments, the materials used for the granules 10 can be selected to impart a desired compressibility giving a desired mouth feel. For example, in some embodiments, the granules 10 can have a compressibility approximating that of a tapioca ball. In other embodiments, the granules can be incompressible and designed to be crunched in a user's mouth.

Granules 10 can also be included with non-tobacco products. For example, granules 10 can be combined with a chewable gum to provide taste and/or texture to the gum. In some embodiments, the gum can include additional smokeless tobacco products. In other embodiments, granules 10 can be packaged along with a preformed object that can be dipped into a section of the packaging having granules 10 to coat the preformed object with granules 10 for consumption. The preformed object can be made of a number of consumable or non-consumable materials. For example, the preformed object can be a lipid soft tab or a pressed sugar stick. In some embodiments, the preformed object can include other smokeless tobacco products. In other embodiments, granules 10 can be included within crystallized confectionaries, such as crystallized maple syrup. Granules 10 can also be included in a bubble tea. For example, granules 10 can either be present in a bubble tea along with or replacing tapioca balls and can have a compressibility approximating that of a tapioca ball.

A plurality of granules 10 can also be sintered together to form a porous matrix. The porous matrix can have a shape adapted to be wholly received in the mouth, e.g., between the lip and the gums. For example, a plurality of granules 10 can be formed into a desired shape and heated such that adjacent granules become bonded together. The process can include heating the plurality of granules 10 to a temperature below the melting point of the outer surface of the granules 10. The plurality of granules 10 can also be sintered in the presence of other tobacco materials, such as moist or dry smokeless tobaccos. The additional tobacco materials can be in powdered form, granular form, or provided as elongated cut tobacco. The other tobacco material can then be present in the resulting pores between adjacent sintered granules. The granules 10 can also include a polymeric outer surface. A polymeric outer surface can include one or more of the following polymer materials: acetals, acrylics such as polymethylmethacrylate and polyacrylonitrile, alkyds, polymer alloys, allyls such as diallyl phthalate and diallyl isophthalate, amines such as urea, formaldehyde, and melamine formaldehyde, cellulosics such as cellulose acetate, cellulose triacetate, cellulose nitrate, ethyl cellulose, cellulose acetate propionate, cellulose acetate butyrate, hydroxypropyl cellulose, cellophane and rayon, chlorinated polyether, coumarone-indene, epoxy, fluorocarbons such as PTFE, FEP, PFA, PCTFE, ECTFE, ETFE, PVDF, and PVF, furan, hydrocarbon resins, nitrile resins, polyaryl ether, polyaryl sulfone, phenol-aralkyl, phenolic, polyamide (nylon), poly (amide-imide), polyaryl ether, polycarbonate, polyesters such as aromatic polyesters, thermoplastic polyester, PBT, PTMT, PET and unsaturated polyesters such as SMC and BMC, polyimides such as thermoplastic polyimide and thermoset polyimide, polymethyl pentene, polyolefins such as LDPE, LLDPE, HDPE, and UHMWPE, polypropylene, inomers such as PD and poly allomers, polyphenylene oxide, polyphenylene sulfide, polyurethanes, poly p-xylylene, silicones such as silicone fluids and elastomers, rigid silicones, styrenes such as PS, ADS, SAN, styrene butadiene lattices, and styrene based polymers, sulfones such as polysulfone, polyether sulfone and polyphenyl sulfones, thermoplastic elastomers, and vinyls such as PVC, polyvinyl acetate, polyvinylidene chloride, polyvinyl alcohol, polyvinyl butyrate, polyvinyl formal, propylene-vinyl chloride copolymer, ethylvinyl acetate, and polyvinyl carbazole. In addition, the polymeric outer surface can be colored, resulting in a colored sintered smokeless tobacco product containing granules 10 and optionally other smokeless tobacco materials between adjacent sintered granules. For example, a plurality of granules 10, each including a core and one or more layers including flavorants and tobacco, can be each be coated with polyethylene. The polyethylene coated granules can then be sintered together into a flat rectangular shape for placement between the lip and the gums. The sintering process can be preformed in the presence of powder tobacco. Descriptions of sintering processes can be found in Provisional U.S. Patent Application No. 61/141,968, filed Dec. 18, 2008, which is hereby incorporated by reference.

IV. Granule Formation

The process of forming the granules can vary depending on the specific equipment used, the specific core material, and the materials forming the one or more layers. In some embodiments, the layers are added successively in a single apparatus used for granule formation. For example, cores can be fluidized and the constituents of each layer added in successive steps, changing the compositions and/or feed rates of each constituent to tailor the composition of each successive layer.

An apparatus that is suitable for granule formation is a fluid bed processor that contains a rotating plate ("rotor") inside the fluid bed. Cores are fluidized by the rotation of the rotor and by the flow of air through the annular clearance between the rotor and the vessel wall. In some embodiments, the rotor has a conical upper surface. The granules 10 can be formed by fluidizing a plurality of preformed cores 12 within the fluid bed rotor processor by rotating the rotor and passing air through the annular clearance between the rotor and the vessel wall.

The components for each layer are then fed to the fluid bed rotor processor to form the one or more layers. The components include at least a binder and, for at least one layer, tobacco particles. The binder can be dissolved or suspended in a food grade solvent or suspension fluid, which can be evaporated during the coating process. The coating solution or suspension can be sprayed by tangential spray guns. A spray nozzle is suitable for introduce a coating solution or suspension into the fluid bed rotor processor. The spray nozzle can be a currently available nozzle which provides adequate atomization of the coating solution. In some embodiments, the one or more spray nozzles can include tangential spray guns. In addition to the binder and a food grade solvent or suspension fluid, the coating solution or suspension can include one or more flavorants.

In other embodiments, flavorants can be separately added to the apparatus used for granule formation. The coating solution or suspension can be sprayed into the apparatus used for granule formation using one or more spray nozzles. In some embodiments, tobacco particles and/or other dry ingredients can be premixed with the coating solution or suspension and fed sprayed into the fluid bed rotor processor as part of the coating solution or suspension.

Dry ingredients can be separately fed to the fluid bed rotor processor. The dry ingredients include the tobacco particles and other particulate ingredients, e.g., starch; that may be included in one or more layers. The other dry particulate ingredients can serve as fillers, flavorants, disintegrants, binders, and/or colorants to produce layers without tobacco particles (e.g., layer 17 of FIG. 1C). A volumetric powder feeding unit is suitable for feeding the dry ingredients to the fluid bed rotor processor. The dry ingredients can be fed to the fluid bed rotor processor simultaneously with the spraying of the coating solution or suspension. The spraying of the coating solution or suspension and the feeding of the tobacco particles or other dry particulate can also be intermittent.

A fluid bed rotor processor allows for a uniform distribution of the tobacco particles within the core and/or each layer, efficient drying of the coating solution or suspension to form each layer, and the ability to apply successive layers in a single operation within the fluid bed rotor processor. The processor can also yield granules having a desired uniformity and conformity in granule size and layer thickness. By varying the rates and/or compositions of the tobacco particles and/or the coating solution or suspension, a plurality of layers each having different compositions can be formed on the plurality of cores 12, which can provide a desired flavor profile, such as those described below. The core can also contain tobacco particles. For example, a core including tobacco powder and a binder can be produced using the fluid bed rotor processor in a first step prior to adding layers using the fluid bed rotor processor. The coating conditions can also be controlled by varying the rotor speed, the inlet air temperature, humidity, and/or the air flow rate. The rotor can rotate at a speed of between 50 and 500 revolutions per minute (e.g., between 185 and 325 revolutions per minute).

The amount of air passing through the annular clearance can be between 5 and 100 cubic feet per minute (e.g., between 10 and 35 cubic feet per minute). The temperature of air passing through the annular clearance can be between 1° and 80° C. (e.g., between 2° and 70° C.). The speed of rotation of the rotor and/or the amount and/or temperature of air passing through the annular clearance can be varied during the granule formation process. An example of a fluid bed rotor processor is sold by VECTOR CORPORATION (Sloan, Iowa) under the trade name GRANUREX® (e.g., the GXR30). The GRANUREX® processor includes a cylindrical vessel and a conical rotor at the base, which rotates around the central axis. Fluid bed processors having a rotor, in particular a conical rotor, can produce granules having more uniform layers than fluid bed processors that lack a rotor.

V. Flavor Profile

Figure 2A:
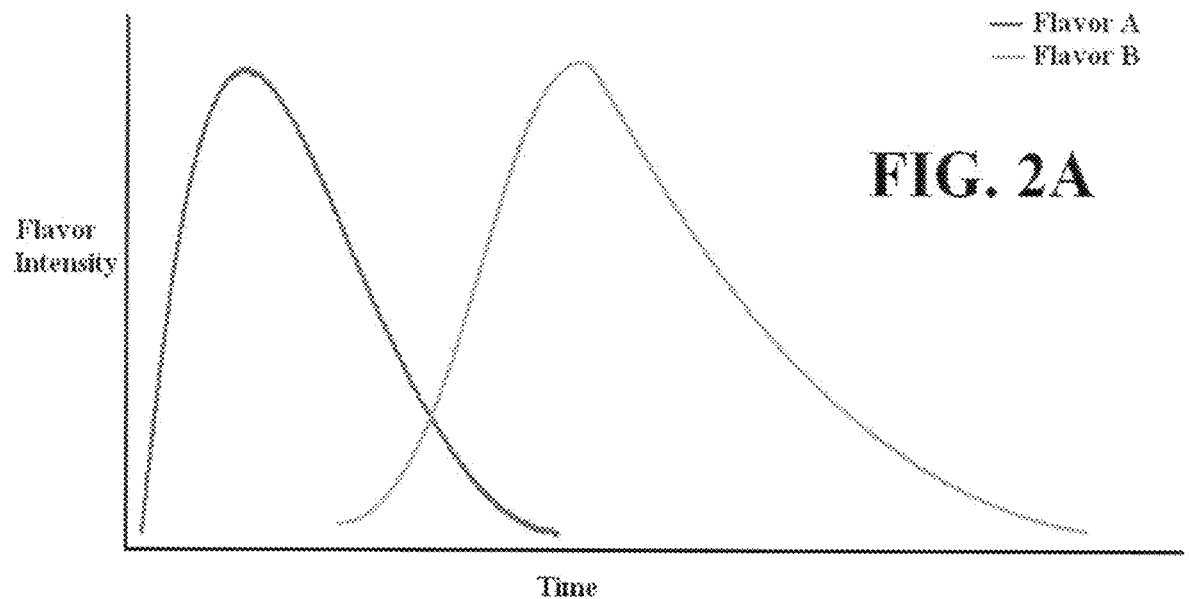
FIGS. 2A and 2B depict flavor release profiles according to different embodiments.

Granules 10 can be formulated to release their components as desired to result in a release profile when a plurality of the granules 10, each having the same arrangement, are orally consumed. The granules 10 can be made in a process that produces a plurality of granules having layers of sufficient uniformity and consistency to control the order of component release when the granules are orally consumed. Furthermore, the rate of component release can be controlled by the composition of each layer and/or the core. These features, either alone or in combination, can result in a plurality of the granules providing, when orally consumed, a desired flavor profile. For example, as shown in FIG. 2A, an adult consumer consuming a plurality of granules 10 having the approximate structure of the granule 10 of FIG. 1A will first detect a first Flavorant A, located within layer 14, for a first period of time. Then, as the layers 14 become fully consumed, the adult consumer will begin to detect a second Flavorant B, located within core 12, for a second period of time until the cores 12 are fully consumed.

Granules 10 can include layers having different disintegration rates. Fast release layers typically disintegrate in under 1 minute and most preferably, in 30 seconds or less, e.g., less than 30 s, 25 s, 20 s, 15 s, 10 s, 5 s, 4 s, 3 s, 2 s, or 1 s. Disintegration can occur by dissolution, melting, enzymatic or other chemical degradation, and/or disruption of the interaction between the binder and tobacco. The binder or tobacco itself may similarly disintegrate. The amount of time required for a composition to disintegrate may be controlled by varying the thickness of the layer and is dependent upon the type of binder, other additives, and the way the granule is consumed. The flavor profile can also be controlled by the concentration and/or intensity of each flavorant in each layer. In some embodiments, granules 10 can include one or more layers having a concentration of at least 50 weight percent flavorant (e.g., 60, 70, 80, or 90 weight percent).

Figure 2B:
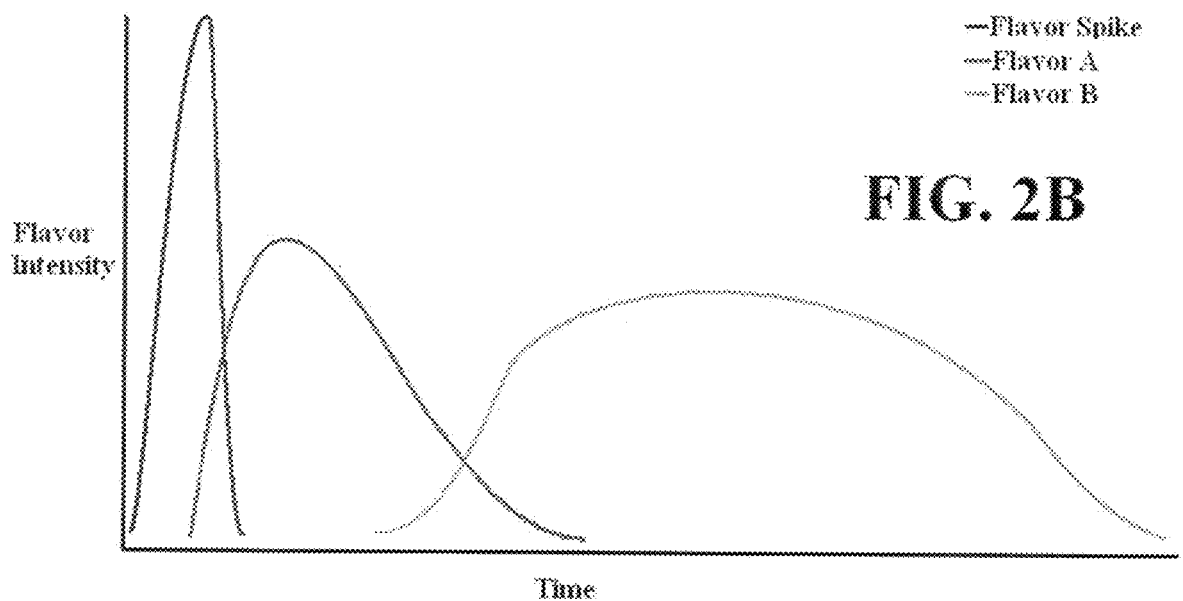

FIG. 2B depicts one possible flavor release profile for a plurality of granules having the approximate structure of the granule 10 of FIG. 2B. As shown, an adult consumer can first experience a flavor spike of a first flavor in the rapidly dissolving layer 15 along the outer surface of the granule 10. A rapidly dissolving outer layer can also provide the adult consumer with an initial burst of tobacco. The second layer 16 can then provide the adult consumer with a second flavor of Flavorant A with a more sustained release of both flavorant and tobacco. Finally, as the layer 16 becomes fully consumed, the adult consumer can then experience a third flavor of Flavorant B, present in the core 12. In other embodiments, the core 12 can provide a high intensity and long lasting flavor. In still other embodiments, a flavor spike can produced by a thin layer having a very high concentration of flavorant, with or without the presence of tobacco.

Granules 10 can be formulated to have different total dissolution times. The total dissolution time of a granule is based upon, inter alia, the number of layers, the disintegration rates of those layers, and the size and composition of the core. The total dissolution time for a granule can be between 5 seconds and 15 minutes. In some embodiments, the granules 10 have a rapid total dissolution time of between 5 seconds and 30 seconds (e.g., between 5 seconds and 10 seconds, between 10 seconds and 20 seconds, or between 20 seconds and 30 seconds). In some embodiments, the granules have a prolonged total dissolution time of between 2 minutes and 15 minutes (e.g., between 2 minutes and 4 minutes, between 4 minutes and 8 minutes, or between 8 minutes and 15 minutes). In some embodiments, the granules 10 have an intermediate total dissolution time of between 30 seconds and 2 minutes (e.g., between 30 seconds and 45 seconds, between 45 seconds and 75 seconds, or between 75 seconds and 2 minutes).

The flavor release profile and the flavor characteristics of the granules 10 or a tobacco composition containing the granules 10 can be evaluated by a sensory panel using techniques known in the art. For example, panelists can be trained and used to evaluate the flavor characteristics of tobaccos according to Grub (1998, In Flavourings by Ziegler & Ziegler, eds., pp. 513-524, Wiley-VCH Verlag GmbH, Weinheim, Germany); Tamura et al. (1989, Agric. Biol. Chem., 53, 1625-1633); and Dunkel et al. (2007, J. Agric. Food Chem., 55:6712-9). In addition, North Carolina State University Sensory Service Center, The Institute for Sensory Research at Syracuse University, Ohio State University Sensory Science Group, the Sensory Laboratory at Oregon State University and Monell Chemical Senses Center in Philadelphia have sensory testing facilities and offer various sensory evaluation services. For example, sensory panel participants can evaluate the intensity of different detected flavorants on a scale of 1 to 10 as a function of time and chart those intensities in charts similar to those shown in FIGS. 2A and 2B. Granules described herein have desirable flavor profiles, e.g., first and second flavorants having flavor intensity peaks in which the flavor intensity of the first flavor is at less than 50% of its peak intensity at the time of the second flavor peak intensity or a first flavorant having a flavor intensity peak at a time prior to the detection of a second flavor.

In general, the delivery of desirable flavor properties is nearly limitless and includes one or more flavorants provided in the core or in one or more layers having the same, similar, or variable dissolution times. Flavor intensity profiles can have intensity peaks that are sequential, overlapping, or concomitant in nature. In some embodiments granules 10 are provided that offer differing flavor release profiles one from the others in that one or more granules release the same or different flavors at the same or differing time points. The use of granules or groups of granules each having different flavor profiles can allow for the mixing and matching of granules having different flavor profiles to yield customizable smokeless tobacco products. For example, one group of granules can provide a burst release of mint flavor, a second group of granules can include a delayed release of cinnamon flavor, and a third group of granules can provide an intermittent release of vanilla; granules from these groups could be selectively combined (e.g., burst of mint with intermittent vanilla, mint with cinnamon, cinnamon with intermittent vanilla, or all three flavors) in varying amounts to yield a desired flavor profile for the overall smokeless tobacco product. The use of the granules can also improve the flavor stability by protecting flavorants from possibly caustic environments until the smokeless tobacco product is consumed.

The invention will be further described in the following examples, which do not limit the scope of the invention described in the claims.

VI. Examples

A VECTOR GRANUREX® GXR30 fluid bed rotor processor was used to make mint-flavored granules. Eight batches were processed, using components shown in Table I.

TABLE 1

| Ingredients | Batch 1 dw % | Batch 1 g | Batch 2 dw % | Batch 2 g | Batch 3 dw % | Batch 3 g | Batch 4 dw % | Batch 4 g | Batch 5 dw % |
|---|---|---|---|---|---|---|---|---|---|
| Sugar Beads | 69 | 2000 | 65.5 | 2000 | 63.93 | 2000 | 55.89 | 1500 | 62.23 |
| Starch | — | — | — | — | — | — | — | — | 16.27 |
| Tobacco Beads | — | — | — | — | — | — | — | — | — |
| Tobacco | 30 | 869 | 30 | 916 | 28.78 | 900 | 33.54 | 900 | 16.27 |
| HPMC (E5) | — | — | 2.5 | 76.3 | 3.18 | 99.34 | — | — | 2.7 |
| HPMC (E15) | — | — | — | — | — | — | 7.53 | 201.96 | — |
| HPMC (K4M) | — | — | — | — | — | — | — | — | — |
| Sucralose | — | — | — | — | 0.19 | 6.03 | 0.17 | 4.65 | 0.16 |
| Pre-hydrated Gum | — | — | — | — | 1.12 | 35 | 1.02 | 27.36 | 0.96 |
| Mint Flavor | 1 | 28.98 | 2 | 61.1 | 2.27 | 71 | 1.02 | 27.36 | 0.96 |
| Sodium Chloride | — | — | — | — | 0.51 | 16 | 0.46 | 12.3 | 0.43 |
| Water | — | 1500 | — | 500 | — | 1500 | — | 489.6 | — |
| Dehydrated Alcohol (ET107) | — | — | — | — | — | — | — | 1836 | — |
| Isopropyl Alcohol (IPA) | — | — | — | 1500 | — | — | — | — | — |

| Ingredients | Batch 5 g | Batch 6 dw % | Batch 6 g | Batch 7 dw % | Batch 7 g | Batch 8 dw % | Batch 8 g |
|---|---|---|---|---|---|---|---|
| Sugar Beads | 1500 | — | — | 45.1 | 1500 | — | — |
| Starch | 392.3 | 23.46 | 750 | 23.4 | 779 | 42.29 | 1009.5 |

TABLE 1-continued

| | | | | | | | |
|---|---|---|---|---|---|---|---|
| Tobacco Beads | — | 46.9 | 1500 | — | — | — | — |
| Tobacco | 392.3 | 23.46 | 750 | 23.4 | 779 | 52.37 | 1250 |
| HPMC (E5) | 65.05 | — | — | 5.56 | 184.91 | 3.89 | 92.75 |
| HPMC (E15) | — | — | — | — | — | — | — |
| HPMC (K4M) | — | 4.21 | 134.72 | — | — | — | — |
| Sucralose | 3.95 | 0.12 | 3.85 | 0.16 | 5.29 | 0.094 | 2.25 |
| Pre-hydrated Gum | 23.24 | 0.75 | 24.1 | 0.99 | 33.02 | 0.56 | 13.25 |
| Mint Flavor | 23.24 | 0.75 | 24.1 | 0.99 | 33.02 | 0.56 | 13.25 |
| Sodium Chloride | 10.45 | 0.34 | 10.83 | 0.45 | 14.81 | 0.25 | 5.96 |
| Water | 780 | — | 1530 | — | 2100 | — | 834.75 |
| Dehydrated Alcohol (ET107) | — | — | — | — | — | — | — |
| Isopropyl Alcohol (IPA) | | | | | | | |

Tobacco from plants having less than 20 μg of DVT per cm$^2$ of green leaf tissue was aged, fermented, pre-conditioned, cased, and milled to produce particles with an average diameter of 27 micrometers and a ninety-ninth percentile diameter of 120 micrometers. It should be noted that the moisture content of the tobacco, as it is processed, is monitored from time to time and adjusted by one or more drying steps. Hydroxypropyl methyl cellulose (METHOCEL™ HPMC E5, E15, and K4M) was obtained from THE DOW CHEMICAL COMPANY. Sucralose sold under the trade name SPLENDA® was also obtained. Sugar spherical cores and starch were from the PAULAUR CORPORATION of Cranbury, New Jersey. PRE-HYDRATED® Gum Arabic (gum arabic/gum acacia) was from TIC GUMS Inc. Sodium chloride salt was from CARGILL. Starch (SPRESS® B820) was from the GRAIN PROCESSING CORPORATION. Dehydrated alcohol (ET107) and isopropyl alcohol (IPA) were from SPECTRUM CHEMICALS & LABORATORY PRODUCTS.

Experiments were carried out using a VECTOR GRANUREX® GXR30 fluid bed rotor system, which is capable of drying, coating, granulating and powder layering. Batches 1 through 5 used sugar spherical cores having an average diameter of between 710 to 850 micrometers. Batch 6 further coated the granules of batch 5. Batch 7 used sugar spherical cores having an average diameter of between 850 and 1000 micrometers. The size ratio between the tobacco particles and cores was greater than 1:100. For batches 1-7, cores were poured into the product container, then intermittently sprayed with a nebulized coating solution, via a tangential spray gun. The tobacco particles were fed to the VECTOR GRANUREX® GXR30 fluid bed rotor system using a K-TRON screw powder-feeding unit made by COPERION.

Batch 1 attempted to coat sugar cores with tobacco particles using water without binder. Mint flavor was also added. The experiment of batch 1 was aborted after ten minutes once it was determined that it did not create tobacco granules.

Batch 2 attempted to coat sugar cores with tobacco powder using a coating solution of IPA containing HPMC E5. Mint flavor was also added. Water was added after forty minutes upon determining that IPA could not satisfactorily dissolve the binding agent. The experiment was aborted after seventy minutes due to insufficient binding.

Batch 3 used HPMC (E5) and water as binder and solvent, respectively, with salt, sucralose, and mint flavor added to adjust taste, and pre-hydrated gum to promote suspension of the hydrophobic mint flavor in solution. After the spherical sugar cores had been loaded into the product container and the system preheated to 22.4° Celsius, a screw feeding unit with a special eductor, designed by VECTOR, was used to contain and direct tobacco powder into the rotor processor. Total coating solution weight was 1727 grams, of which 1180 grams were used to powder layer 900 grams of dry tobacco powder—giving a powder-to binder solution ratio of 1:1.31. The remainder of the coating solution was applied after all tobacco particles had been fed into the processor. Batch 3 granules had a total dissolution time of about 15 seconds.

Batch 4 used HPMC (E15) as the binder and 3000 grams of ET107 as the solvent. 800 grams of water were added to the coating solution after ten minutes. In all, 900 grams of tobacco particles were layered with 1300 grams of coating solution—a ratio of 1:1.44. An additional 1300 grams of coating solution was applied after all tobacco particles had been fed into the processor; 1647 grams of solution remained unused. Batch 4 granules had a total dissolution time of about 40 seconds.

Batch 5 used HPMC (E5) as a binder and water as the solvent. About 785 grams of a 1:1 mixture of tobacco and starch was layered at an increased powder feeding rate of 1000 grams/hour, using 900 grams of solution for a particulate to coating solution ratio of 1:1.15. Batch 5 granules had a total dissolution time of about 30 seconds.

Batch 6 used the granules of batch 5 as a starting core and added a second layer. Batch 6 used HPMC (K4M) as a binder and water as the solvent. 1500 grams of a starch and tobacco mixture having a 1:1 ratio was layered using 1442 grams of the coating solution for a powder-to-solution ratio of 0.96:1. An additional 268 grams of solution were applied to the granules after powder layering. The powder feeding rate was increased, relative to other batches, to between 1250 and 2000 grams/hour. Batch 6 granules had an average total dissolution time of about 300 seconds.

In batch 7, 300 grams of flavored coating solution was applied to the sugar cores prior to powder layering. 1560 grams of powder with a 1:1 tobacco-to-starch ratio was layered using 2260 grams of water-based coating solution—a ratio of 1:1.45. An additional 100 grams of solution was applied after powder layering. Batch 7 granules had an average total dissolution time of about 240 seconds.

In batch 8, starch and tobacco powder were loaded into the product container. Granulation was initiated once the system reached a pre-heat temperature of 30° C., using HPMC (E5) as binder and water as solvent. In batch 8, the tobacco powder and/or the starch initiates the granule formation and thus act as cores. Batch 8 granules had an average total dissolution time of less than 5 seconds. In other embodiments, the granules produced in batch 8 can further be used as the cores and layers added to the granule of batch 8.

The experiments discussed above resulted in six different types of tobacco granules. Characteristics of the different types of granules are shown in Table II.

TABLE II

| Batch | Average Core Size (microns) | Resulting Product Size D50 (microns) | Resulting Product Size D99 (microns) | Binder | Average dissolution time[1] |
|---|---|---|---|---|---|
| 1 | 800 | N/A | N/A | None | N/A |
| 2 | 800 | N/A | N/A | HPMC (E5) | N/A |
| 3 | 800 | 1074 | 1752 | HPMC (E5) | 15 |
| 4 | 800 | 1123 | 1180 | HPMC (E15) | 40 |
| 5 | 800 | 1231 | 1904 | HPMC (E5) | 30 |
| 6 | 800 | 1348 | 1950 | HPMC (K4M) | 300 |
| 7 | 1000 | 1336 | 1947 | HPMC (E5) | 240 |
| 8 | 27 | 946 | 946 | HPMC (E5) | <5 |

[1]Dissolution time is the average approximate time in seconds that was required to completely dissolve a granule when orally sampled.

The granules produced in each batch were taste tested by experienced testers. The average dissolution time was measured by the experienced testers. HPMC (E5) was used as a binder to confer a rapid flavor release, HPMC (E15) was used as a binder to confer a relatively moderate rate of flavor release, and HPMC (K4M) was used as a binder to confer a relatively slow flavor release. Batch 4 granules contained an additional outer layer designed to decrease the tobacco release rate and extend flavor release duration. The batch 5 granules were intended to have a slower dissolution rate, which was achieved. Batch 6 granules were intended to have a slow initial disintegration of the outer layer, followed by a more rapid disintegration of the inner layer. The larger average granule size contributed to the longer average dissolution time. The large core size and relatively thick layers of batch 7 granules let to a relatively longer average dissolution time. In addition, batch 7 granules had a layer intended to generate a flavor spike toward the end of granule disintegration. However, the amount of coating solution used appeared to be insufficient to produce the desired flavor effect.

The granules made during these experiments were stored for ten months at room temperature. No noticeable change in flavor, pH or percentage of oven volatiles was observed.

A number of embodiments have been described. Nevertheless, it will be understood that various modifications may be made without departing from the spirit and scope of this disclosure. For example, some smokeless tobacco products can include granules having a rapid release binding agent can be used in the outer layer for immediate satisfaction, then a slow release agent in the intermediate layers for sustained flavor, and a rapid release agent in the core or immediately surrounding the core for a final flavor flash. Still other smokeless tobacco products can include combinations of granules having different flavorant, flavor release, and disintegration properties. Accordingly, other embodiments are within the scope of the following claims.

What is claimed is:

1. A smokeless tobacco product comprising an orally disintegrable granule, the granule including:
   a core having a diameter ranging from 300 μm to 2 mm, the core including an insoluble gel;
   a first layer surrounding the core, the first layer having a first composition including tobacco; and
   a second layer surrounding the core, the second layer having a second composition different than the first composition, at least one of the first layer and the second layer being at least 50 weight percent flavorant, the second layer not including tobacco,
   wherein the second layer is configured to be a rapid-dissolving layer,
   wherein the first layer is configured to be a sustained release layer,
   wherein the first layer has a first binder,
   wherein the second layer has a second binder,
   wherein the first binder includes a chemical compound that is not in the second binder such that the first binder is configured to confer a slow flavor release and the second binder is configured to confer a fast flavor release, and
   wherein the first layer surrounds the second layer.

2. The smokeless tobacco product comprising an orally disintegrable granule of claim 1, wherein the orally disintegrable granule includes a flavor profile having two different flavors each having a peak flavor intensity being perceptible at different times during consumption in a standardized sensory evaluation.

3. The smokeless tobacco product comprising an orally disintegrable granule of claim 2, wherein the peak flavor intensities are sequential.

4. The smokeless tobacco product comprising an orally disintegrable granule of claim 1, wherein the orally disintegrable granule includes a flavor profile having two different flavors each having a peak flavor intensity and the peak flavor intensities are overlapping.

5. The smokeless tobacco product comprising an orally disintegrable granule of claim 1, wherein the core includes tobacco.

6. The smokeless tobacco product comprising an orally disintegrable granule of claim 5, wherein the tobacco is in a form of a compressed powder.

7. The smokeless tobacco product comprising an orally disintegrable granule of claim 1, wherein the core is free of tobacco.

8. The smokeless tobacco product comprising an orally disintegrable granule of claim 1, wherein at least one of the first binder and the second binder includes a hydroxyl-containing compound and a dextran or a dextran derivative.

9. The smokeless tobacco product comprising an orally disintegrable granule of claim 1, further comprising:
   a third layer surrounding the first layer and the second layer.

10. The smokeless tobacco product comprising an orally disintegrable granule of claim 1, wherein the granule is substantially spherical.

11. The smokeless tobacco product comprising an orally disintegrable granule of claim 1, wherein the tobacco is present in the first composition at a concentration ranging from 15 weight percent to 35 weight percent.

12. The smokeless tobacco product comprising an orally disintegrable granule of claim 1, wherein the diameter of the core ranges from 500 μm to 1 mm.

13. The smokeless tobacco product comprising an orally disintegrable granule of claim 1, wherein the tobacco includes non-fermented tobacco particles.

* * * * *